United States Patent [19]

Lefkowitz

[11] Patent Number: 4,740,409

[45] Date of Patent: Apr. 26, 1988

[54] NONWOVEN FABRIC AND METHOD OF MANUFACTURE

[76] Inventor: Leonard R. Lefkowitz, 14 Alpine Dr., Latham, N.Y. 12110

[21] Appl. No.: 33,023

[22] Filed: Mar. 31, 1987

[51] Int. Cl.⁴ .............................................. B32B 7/02
[52] U.S. Cl. .................................. 428/131; 428/137; 428/280; 428/286; 428/287; 428/294
[58] Field of Search ............... 428/131, 137, 280, 286, 428/287, 294

[56] References Cited

U.S. PATENT DOCUMENTS 4,382,987  5/1983  Smart .................................. 428/294
4,469,221  9/1984  Albert .................................. 428/294

Primary Examiner—Marion C. McCamish
Attorney, Agent, or Firm—Kane, Dalsimer, Sullivan, Kurucz

[57] ABSTRACT

This invention is directed to a nonwoven fabric having knuckle-free planar surfaces being comprised of (1) parallel linear machine direction yarns residing in a single plane and (2) interconnecting, cross-machine direction polymeric material also residing in said plane and substantially entirely surrounding the machine direction yarns, the cross-machine direction material containing spaced perforations through the fabric. The invention is also directed to the manufacture of such nonwoven fabric.

15 Claims, 4 Drawing Sheets

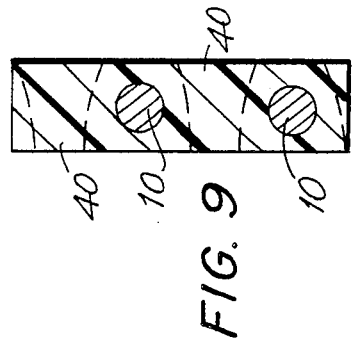
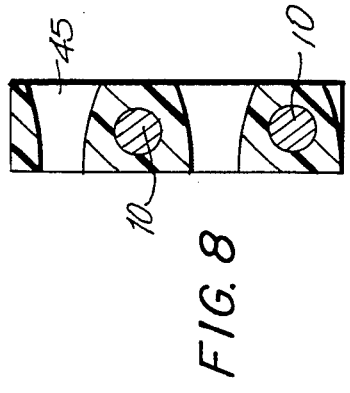
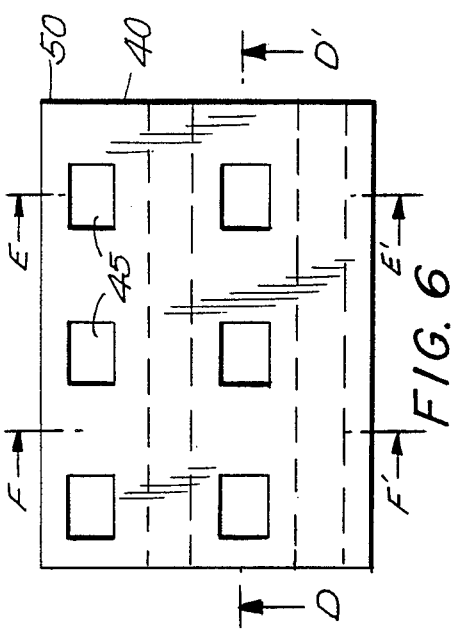
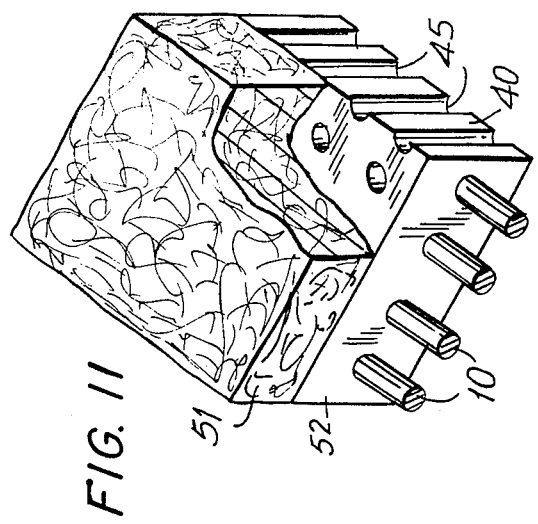
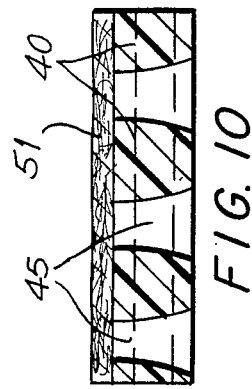
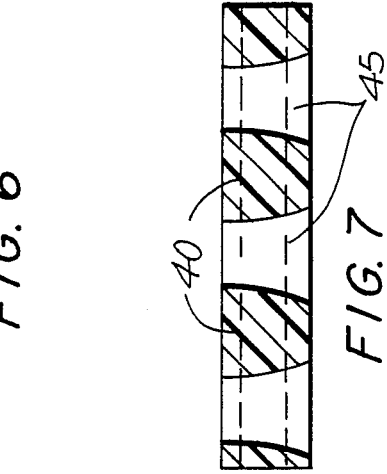

NONWOVEN FABRIC AND METHOD OF MANUFACTURE

FIELD OF THE INVENTION

This invention relates to a nonwoven fabric. More particularly, this invention relates to nonwoven paper machine forming fabrics, felts and dryer fabrics and the manufacture thereof, other uses also being contemplated.

BACKGROUND OF THE INVENTION

For many years weaving has been the principal method of constructing fabrics for use on paper machines. In the case of papermaker felts, some success has been achieved with needle punched nonwoven felts of the "fillingless" type. See, for example, U.S. Pat. No. 3,392,079, incorporated herein by reference. Such felts are made by winding spaced apart parallel machine direction yarns around tension rollers, covering the yarns with fiber batt, and needling the batt into the yarns from both sides to form a consolidated nonwoven felt.

Under low press loadings such fillingless felts operate satisfactorily; however, under high press loadings fillingless felts are not satisfactory because the machine direction yarns leave undesirable indentations in the paper sheet. Furthermore, such fillingless felts are prone to widening during operation on the paper machine. Thus, such felts are seldom used on highly loaded presses.

Although nonwoven felts are known, it has not been hitherto possible to make paper machine forming fabrics without weaving. The idea of making a satisfactory forming fabric by needling batt fibers into a parallel array of yarns in the same manner as fillingless felts is not practical because such a product would lack sufficient surface uniformity and drainage, would tend to fill up with fines, and would interfere with release of the sheet after formation. Nevertheless, the concept of producing a forming fabric without weaving, has been the subject of continuing interest due to the high cost of manufacturing woven forming fabrics by present methods.

In the case of paper machine forming fabrics, present trends are toward multi-layer woven fabrics having coarse woven substrates made of thick yarns in the wear side of the fabric, with small yarns woven in fine mesh in the sheet forming side of the fabric. The coarse yarns are used to impart wear resistance to the fabric, while the fine mesh surface is used to achieve good sheet formation. It has not been possible to make a woven forming fabric with a smooth sheet forming surface using the same coarse yarns needed to achieve the desired wear properties. The multi-layer fabrics, while providing both smooth surfaces and good wear properties, are difficult and time-consuming to manufacture due to their structural complexity.

Nonwoven fabrics and the manufacture thereof are well known. For example, U.S. Pat. Nos. 4,259,399 and 4,285,748, both of which are incorporated herein by reference, disclose the preparation of nonwoven fabrics. However fabrics prepared therein are not suitable for the applications contemplated here.

With regard to papermakers felts having porous incompressable woven substrates capped with porous fiber layers, known as batt on mesh felts, such felts require sufficient batting to reduce the extremes of pressure that would otherwise occur over fabric knuckles or weave crossovers. This is necessary since otherwise uneven pressure would reduce press dewatering efficiency and might have an adverse effect upon sheet quality.

When prior art woven felts are made with incompressable monofilaments, such base fabrics invariably contain interconnected water flow passageways between yarns. Such passageways allow water to flow forward in the machine direction through the felt base fabric while the felt and paper sheet are subjected to hydraulic and mechanical pressure in the press nip. Such transverse water flow forward in the nip may contribute to increased sheet moisture and reduced pressing efficiency.

Transverse passageways in the woven base fabric also provide channels for the entry of air into the expanding sheet and felt as they leave the press nip. It is suspected that such air entry into the incompressible woven felt substrate may facilitate water transfer from within the sheet-felt interface back into the expanding paper sheet as it emerges from the press nip, thereby reducing press efficiency.

In the manufacture of filtration fabric belts for sludge concentration as well as other purposes, it is often desired to produce a fabric having many small openings, made from yarns that are large enough to provide long service life. Where such yarns are thick monofilaments, they are difficult to weave close enough together to provide the fine mesh openings desired. A compromise is often necessary, the compromise involving a trade-off to smaller yarns so that the desired mesh can be woven.

A nonwoven paper machine dryer fabric comprised of plastic monofilament spirals is also known. Each spiral is joined to its neighbor by means of a pin inserted through the intermeshed loops of the adjoining spiral to form an endless porous dryer fabric belt. As a result of this joining method, such belts are susceptible to failure should any one of the thousands of spiral connecting pins fail during operation on the paper machine.

Porous plastic sheets are known where holes are formed in the plastic sheet during formation, such as by extrusion of two sets of filaments at right angles to each other followed by fusing them together at crossover points. Such sheets are comprised of unoriented polymer material, and if they are produced in the fineness needed for the papermaking application, they would lack sufficient dimensional stability to operate as endless belts on paper machines. This type of material may be subjected to stretching to orient the filaments to achieve increased stability, but at the price of causing the spaces between members to increase beyond the fineness needed for certain applications.

Dimensionally stable plastic sheet material may be rendered porous by means of perforating, drilling, or the like; however, such fabrication methods preclude the use of combinations of materials that are particularly suited for specific tasks. For example, machine direction stretch resistance may best be satisfied with high modulus materials, whereas, cross-machine direction needs may call for materials that are resilient and of lower stiffness.

OBJECTS OF THE INVENTION

It is an object of the invention to provide dimensionally stable nonwoven fabrics for paper machines as well as other uses having machine direction reinforcing members and smooth surfaces.

It is also an object of the invention to provide fabric for paper machines and other uses with essentially no vertical or horizontal crimp, and with machine direction and cross-machine direction members lying substantially entirely in the same plane.

It is a further object of the invention to provide nonwoven felts for papermaking and other uses wherein the non-deformable base fabric layer contains vertically disposed fluid flow passageways that are not interconnected.

It is a yet further object of the invention to provide felts or forming fabrics having fine fiber or foam sheet contact surfaces integrally bound to a nonwoven base fabric.

It is a still further object of the invention to provide nonwoven fabrics for papermaking as well as for other purposes having high modulus load bearing reinforcing elements disposed in the machine direction and substantially entirely encapsulated by porous polymeric matrix material characterized a having resistance to abrasive, chemical, or heat degradation.

It is additionally an object of the invention to provide novel nonwoven fabrics wherein the cross-machine direction polymeric matrix material may be selected from among a wide range of materials, including at least some materials which are not formable into textile yarns.

These and other objects of the invention will become more apparent in the discussion below.

BRIEF DESCRIPTION OF THE DRAWINGS

FIG. 6 represents a perspective view of a portion of a fabric of the invention;

FIG. 7 represents a cross-sectional view in the machine direction taken along line D–D' of the fabric shown in FIG. 6;

FIG. 8 represents a cross-sectional view in the cross-machine direction taken along line E–E' of the fabric shown in FIG. 6;

FIG. 9 represents a cross-sectional view in the cross-machine direction taken along line F–F' of the fabric shown in FIG. 6

FIG. 10 represents a cross-sectional view in the machine direction taken of another variant of the fabric having a layer of fiber batt adhered to its top surface; and FIG. 11 represents a perspective view of the fabric of FIG. 10 with a portion of the fiber batting removed for added clarity.

DETAILED DESCRIPTION OF THE INVENTION

Figure 1:
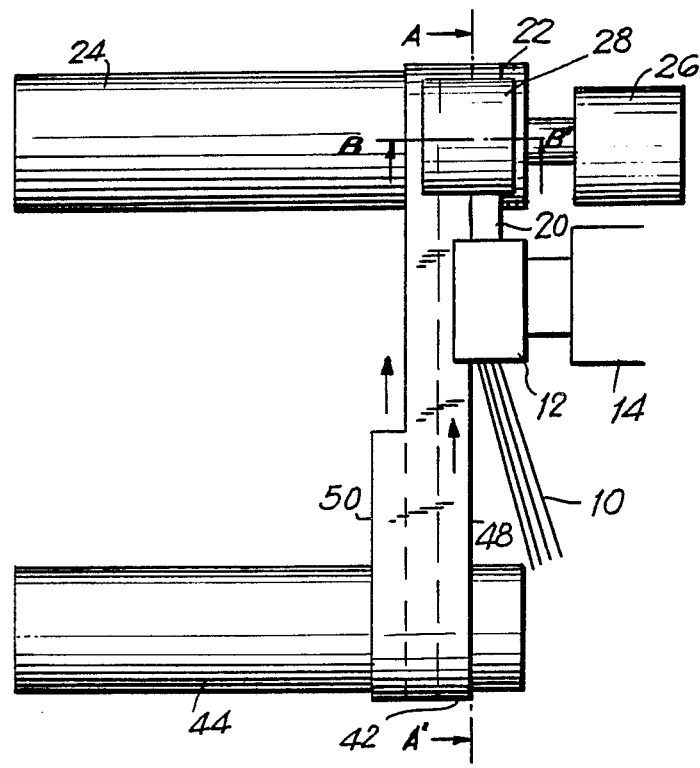
FIG. 1 represents a perspective view of an apparatus used to make the fabric of the invention.

This invention comprises a nonwoven fabric having essentially no vertical or horizontal crimp, where machine direction and crossmachine direction members all reside in the same plane. More particularly, the nonwoven fabric of the invention comprises machine direction tension bearing flexible monofilament, multifilament, or spun yarns arranged in side by side spaced apart parallel array, joined together and substantially entirely encapsulated by a polymeric matrix material containing vertically disposed fluid flow passageways therein.

Forming fabrics for paper machines operate at high speeds while under substantial machine direction (i.e., the direction in which the fabric runs) tension. In fact, some machine positions are so sensitive to stretch that even a one percent extension may result in the need to remove the fabric from operation on the machine. In the case of woven forming fabrics, such fabrics are subject to extension by two mechanisms: machine direction yarn stretch and machine direction yarn straightening through crimp interchange. In U.S. Pat. No. 3,858,623, incorporated herein by reference, a woven fabric construction is taught which avoids stretch due to crimp interchange.

In the fabric of this invention there is no crimp imparted to the machine direction yarns because they are not interlaced with a second system of yarns as in woven fabric. Rather, the machine direction yarns lie perfectly straight within the surrounding and substantially encapsulating polymeric matrix material. Demand for cross-machine direction stability may readily be met by the matrix material, even though it is not oriented, as are the high modulus machine direction yarns. Cross-machine direction loads are only a small fraction of machine direction loads. More important is the ability of the matrix material to provide the necessary long lasting wear surfaces needed for competitive performance in this application.

The matrix material may be selected from a wide variety of polymeric materials without regard for their ability to be formed into fibers or yarns. One of the best materials in terms of wear resistance is polyurethane. Even though this material is not available in usable yarn form, it could be used for the matrix material of fabrics of this invention intended for the forming fabric application. Other useful materials include polyesters, such as polyethylene terephthalate, polyamides, such as nylon, specifically nylon 6, nylon 6,6, or nylon 12, and polyethylene. The matrix material preferably has a melting temperature lower than that of the yarn employed.

In the case of felts for papermaking and like purposes, the porous matrix layer is comprised of non-deformable polymeric material. By non-deformable it is meant that any deformation that may take place during passage of the felt through the paper machine press nip would be minimal such that fluid passageways contained within the non-deformable matrix layer would remain open, thereby continuing to provide void space for the accommodation of fluid even under high press loading conditions.

The preferred papermaking felt of this invention would have a sheet contacting surface layer comprised of porous resilient fibers or foam attached to the base layer by fusion bonding or the like. Preferably, the fibrous surface layer would be mechanically interlaced as, for example, by needling prior to attachment to the base. This would give batt fibers some vertical alignment and would impart physical integrity to the batt prior to attachment. It would also insure that fibers from the top of the batt as well as fibers from the bottom of the batt would become adhered to or embedded within the non-deformable matrix material of the base layer.

Where fabrics of the invention are intended for geotextile or filtration applications, porous fibers or foam may optionally be added to one or both sides of the yarn containing matrix material. In the alternative, they may be positioned throughout the matrix material itself, according to the application requirements.

In the case of nonwoven fabrics of the invention intended for the paper machine dryer section, machine direction tension bearing members may preferably be selected from among those materials noted for their hydrolytic stability and resistance to heat degradation. Materials such as Nomex or Kevlar (polymeric materials available from DuPont) may be considered, even though such materials are available only in spun or filament yarn form and would ordinarily wear out rapidly in woven dryer fabric structures. By encapsulating such yarns within the matrix material, they can be protected from abrasive wear and exposure to steam which otherwise would significantly reduce their service life.

Present dryer fabrics often use polyester monofilaments, despite their susceptibility to damage by hydrolysis. By encapsulation of polyester yarns within the matrix material according to the invention, such yarns would be protected from steam exposure, thereby preserving yarn strength better than in woven or spiral mesh nonwoven dryer fabrics.

In the case of dryer fabrics, the matrix material itself may be selected from among the entire spectrum of flexible polymeric compounds without regard to yarn forming ability of the material. Whereas conventional woven or spiral mesh dryer fabrics are comprised of textile yarns with the possible addition of resin treatments, the dryer fabric of this invention may utilize a nonfiber forming matrix material if this would provide better service life or afford manufacturing or material economies. For example, silicone rubber may prove to be an ideal matrix material even though it is not presently available in yarn form for use in woven dryer fabrics.

Fabrics of this invention may be produced in either endless belt form or in flat form. Also, fabrics may be readily produced by use of a machine direction yarn that is either non-melting or possesses a melting temperature higher than that of the polymeric matrix material.

In other cases the matrix material may be a thermosetting plastic material, or it may be a resinous material which is water-reactive. In still other cases, the matrix material may be a reaction molding compound which polymerizes almost immediately after being mixed together.

Figure 2:
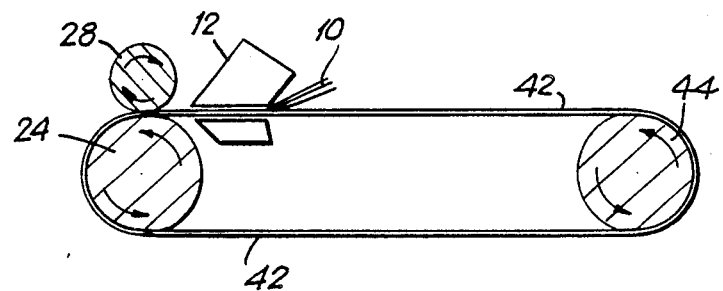
FIG. 2 represents a lateral cross-sectional view of the apparatus shown in FIG. 1 taken along line A–A'.
Figure 5:
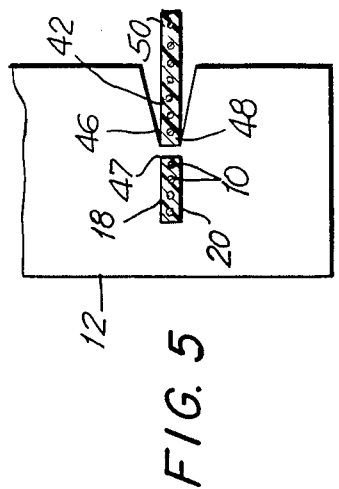
FIG. 5 represents a front, cross-sectional view taken along line C–C' of FIG. 4.
Figure 4:
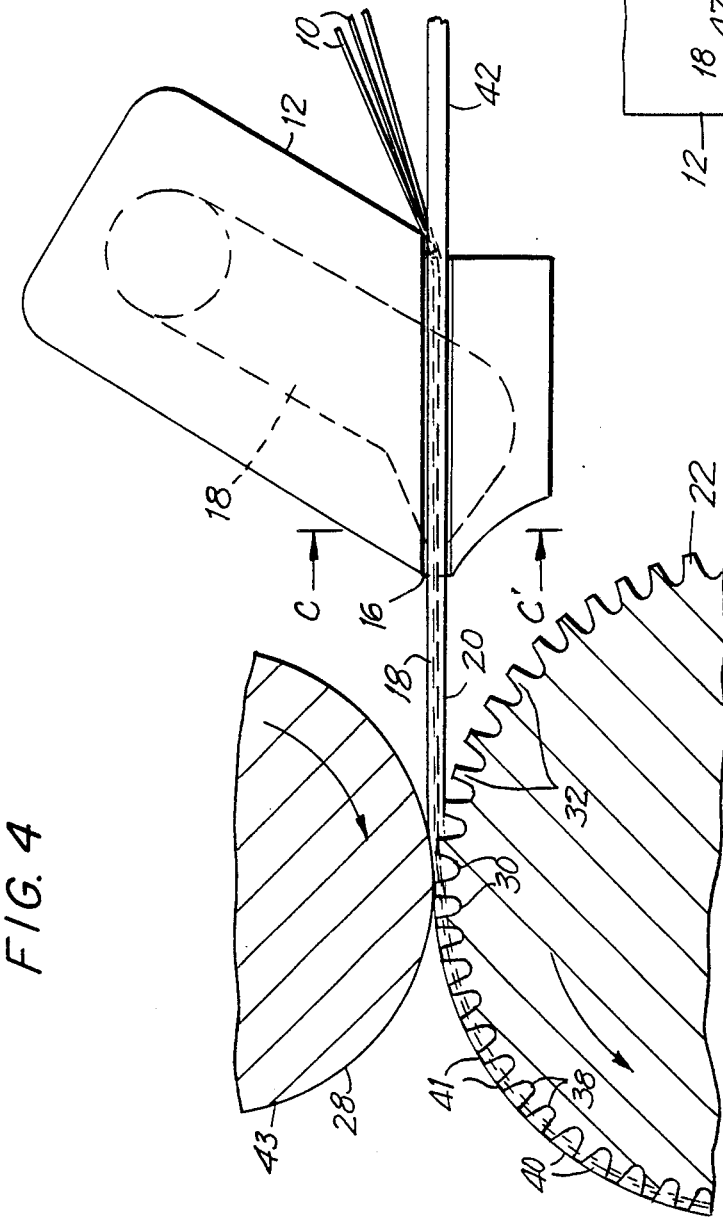
FIG. 4 represents a lateral, cross-sectional view of a detail of the apparatus shown in FIG. 1 along line A–A'.

The invention can be better understood by making reference to the drawings. In FIGS. 1, 2, and 4, an array of monofilament, multifilament, or spun yarns 10 is fed into extruder die 12 attached to extruder 14, which is filled with matrix material 18. Yarns 10 are pre-tensioned to provide better control. The extruder die outlet 16 is shaped to produce a ribbon-like tape having a side-by-side array of parallel yarns 10 encapsulated within molten plastic matrix material 18. This can be seen more clearly in FIG. 5.

As set forth in FIGS. 1 and 4, newly formed tape 20 is immediately fed into pinned section 22 of drive roll 24 while the plastic matrix material 18 is still in a melted state. Drive roll 24 is driven by variable speed motor 26 at a speed that accommodates the output flow of extruder 14.

Figure 3:
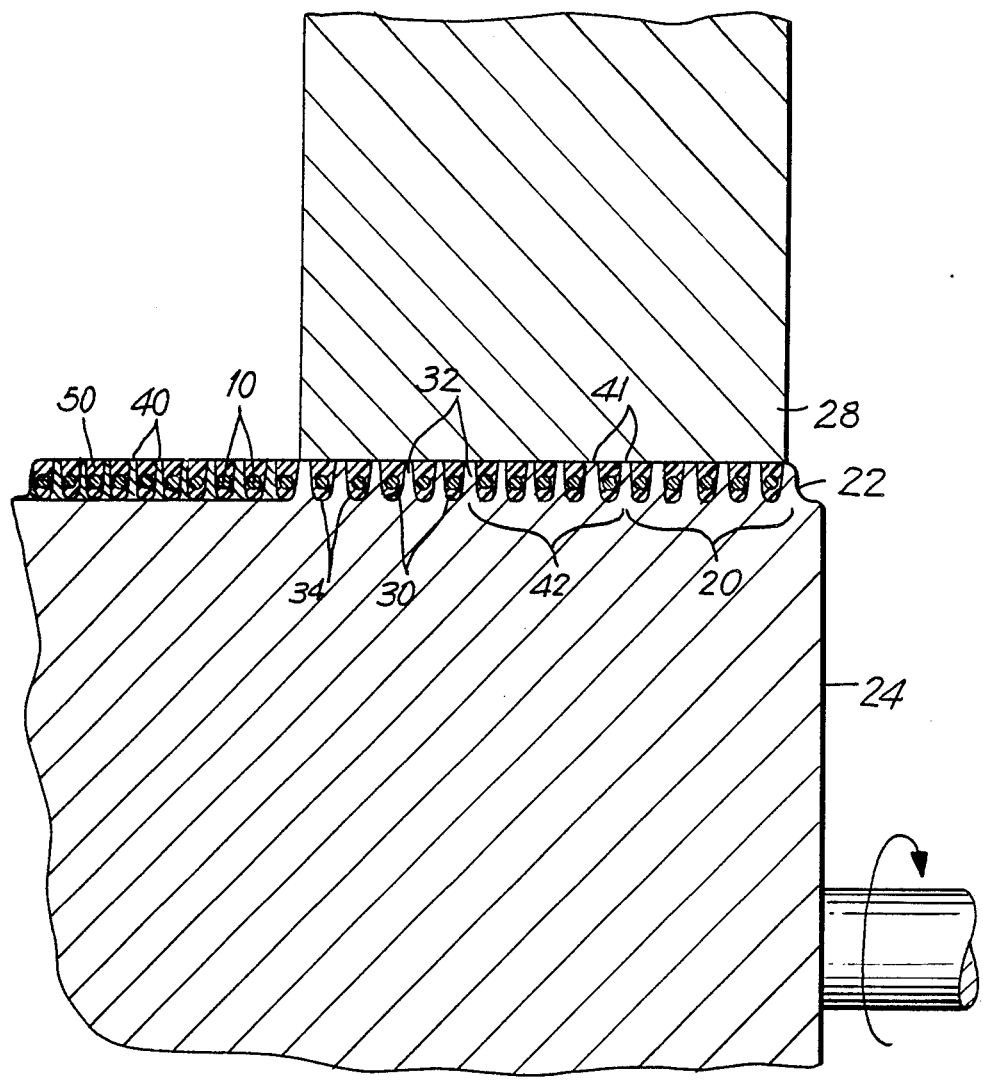
FIG. 3 represents a partial, front, cross-sectional view of the apparatus shown in FIG. 1 along line segment B–B'.

Immediately subsequent to contact with the pinned section 22, the newly formed tape is subjected to conditions of heat and pressure by heat press roll 28, thereby forcing the still soft extrudate down into the grooves 30 between pins 32 of pinned section 22. Yarns within the tape are guided into and become embedded within machine direction grooves 34, where they are surrounded and encapsulated by solidifying plastic matrix material. Plastic matrix material is likewise forced into cross-direction grooves 38 to form cross-direction interconnecting structural members 40 (FIG. 3).

Top-most pin extremities 41 contact the outer surface 43 of heated roller 28. This forces plastic material from between these mating surfaces and causes formation of holes 45 at each such contact point.

For flat fabric, pinned section 22 extends fully across drive roll 24, so that the desired fabric width can be produced in a single pass. In such a case the material continues around the pinned roll until it cools sufficiently to completely solidify, whereupon it is pulled off the pinned roll by a fabric windup device. Flat formed fabric of the invention may subsequently be formed into endless belts by conventional joining methods.

To produce wide endless fabrics suitable for purposes such as paper machine clothing without need for a subsequent joining step, it is necessary to make repeated passes onto the pinned section 22 as shown in the drawings. In such endless fabric production, the newly formed tape continues halfway around the pinned section 22 while it solidifies into hardened tape material 42. The hardened tape travels around tail roll 44 and then is returned to a position on pinned section 22 immediately adjacent to the next successive wind of newly forming tape 20.

It should be understood that newly forming tap 20 and hardened return run tape 42 are actually successive portions of the same continuous tape. However, for purposes of clarification, they are referred to as if they were separate entities.

Prior to reentering pinned section 22, return run tape edge 48 adjacent to newly forming tape 20, is brought into intimate contact with the slotted outer surface 46 of extruder die 12 so that it is softened and fuses into adjacent melted edge 47 of newly forming tape 20. Both the return run tape 42 and newly formed tape 20 are then fed side-by-side adjacent to each other on to pinned section 22, where they are subjected to heat and pressure by press roll 28, thereby improving the bonding between the two tapes. Through this means, newly formed tape 20 is continuously joined to previously formed and hardened tape 42 into an endless porous belt 50 comprised of side-by-side tapes whose boundaries are barely discernible.

The thickness of the machine and cross-machine direction members created by this method need not be the same. It is desirable in most cases that the yarn be fully encapsulated. It should be understood that many variations in pin shape and spacing may be utilized to achieve particular construction objectives, dependent upon the end use application of the flat fabric or endless belt being produced.

For geotextile or filtration applications, fabrics of this invention may be further enhanced by the adddition of a layer of porous membrane, open cell foam, fibrous matt, fibrous fibers, or the like to one or both sides of the yarn-containing matrix material. Alternatively, foam or fibers may be positioned throughout the matrix material itself. In the papermaking field, for example, a fine pore size open cell foam may be added to the sheet contacting surface of the fabric to render the fabric suitable for use as a wet press felt.

In some cases, the surface 43 of heated top roll 28 may be embossed to impart a particular surface pattern to the fabric as it is formed.

It should be noted that the fabric of this invention differs from conventional woven fabrics in several respects. In particular, the requirement of woven fabrics that machine direction yarns pass over or under cross-machine direction yarns does not apply to the fabrics of this invention. As can be seen from FIGS. 7 to 11, the matrix material encapsulating machine direction yarns lies in the same plane and interconnects with cross-machine direction matrix material. With this type of construction the homogeneous combination of matrix materials in machine and cross-machine directions can provide independent non-interconnected void spaces between yarn elements. This factor may have special significance when the fabric of this invention is employed as a wet press felt for papermaking.

FIG. 6 shows a top view of an embodiment of the invention. Here, it may be clearly seen that the fabric is in actuality a porous reinforced plastic composite where machine direction yarns are the reinforcement elements and the surrounding matrix material contains fluid passageways, fully encapsulates the yarns, and joins yarn to yarn to make the nonwoven fabric of the invention.

In FIGS. 10 and 11, a fibrous surface layer 51 is shown integrally bound to matrix material 52. In the preferred case, such bonding is accomplished by pressing the heated fibrous layer 51 down into the lower melting temperature matrix material while partially melting this material, thereby allowing the batt fibers to become firmly embedded within the matrix material.

In the discussion above, the problem of water flow in the press nip was addressed. It is thought that fabrics of the present invention will provide substantially more flow control than present felts. Water, having flowed through a fine porous sheet contact layer, may only pass vertically into the void spaces between machine direction and cross-direction fabric members since such void spaces are not interconnected but, rather, are surrounded by matrix material which forms effective barriers to the transmission of water in the transverse plane, and in particular, in the machine direction.

In another variation of the process, fabric of the invention is made entirely from sheath-core yarns having a core comprised of non-melting or high temperature melting monofilament or multifilament yarn and a sheath comprised of lower melting temperature fusable material. For example, the yarn core may be a high modulus nylon 6,6 multifilament and the yarn sheath may be nylon 12 material.

An array of side by side sheath-core yarns are fed into the machine direction grooves 34 of pinned roll section 22, where they are forced down into the grooves by heat and pressure by press roll 28. The sheath core monofilament cross section area is greater than the area of machine direction groove 34, so that excess melted sheath material is forced into cross direction grooves 38 to form the cross directional interconnecting structural members 40.

The following examples are intended to illustrate the invention and should not be construed as limiting the invention thereto.

EXAMPLES

EXAMPLE 1

An endless porous belt of this invention was formed utilizing an experimental apparatus of the type described above. A matrix material comprised of nylon 12 (melting temperature 340° F.) was used to encapsulate an array of seven 0.014 in. diameter high modulus polyester monofilament yarns (melting temperature 475° F.). The yarns were fed into the extruder die to emerge completely encapsulated by the matrix material. The extruder and die were operated at 385° F., sufficiently hot to melt the matrix nylon material but not hot enough to melt or adversely effect the polyester monofilament yarns.

A 3.4 in. diameter ×0.5 in. wide pinned section of the drive roll having 38 pins per inch in the machine direction and 32 pins per inch in the cross-machine direction was utilized. The pins each had a rectangular, flat tip with a surface of 0.007 in. in the cross-machine direction and 0.010 in. in the machine direction. The pins were 0.032 in. high in both directions, i.e., the grooves between pins were of equal depth in both directions.

The pinned section had machine direction grooves that were large enough to fully accomodate the monofilament yarns to be encapsulated in the plastic matrix, i.e., these monofilaments could fit into machine direction groove and be recessed midway down into the space between pins.

To produce endless fabrics according to the invention, newly formed tape containing seven monofilament yarns and measuring approximately 7/38 in. wide was produced. This tape was squeezed down into the grooves between pins by the heated press roll and solidified by the time it had traveled half way around the drive roll. The hardened tape was guided around the tail roll, then against the slotted die edge, and finally back onto the drive roll immediately adjacent to the newly formed tape then being produced.

Each newly created tape wind was fed back onto the pinned roll section in the manner described above. With each subsequent wind of the belt, the tapes would advance progressively further down the drive roll surface away from the pinned section. This process was repeated until an endless belt had been formed which measured 9 in. wide ×45 in. in loop length. At that point the extruder and drive roll were stopped, the apparatus was dismantled, and the endless belt was removed.

EXAMPLE 2

A belt similar to that described in Example 1 was formed using 0.012 in. diameter polyester monofilaments and nylon 12 as the matrix material. The procedure of Example 1 was followed except that excess plastic material was utilized to completely fill one outside machine direction groove on each edge of the newly formed tape. Plastic matrix material also filled in all of the crossmachine direction grooves within nine machine direction groove widths.

With seven monofilaments occupying adjacent grooves, a tape of nine groove widths, measuring 9/38 in. wide, was produced and repeatedly wound around the apparatus in the manner described above to form an endless porous belt having the same physical characteristics as that of Example 1 except for reduced machine direction strength. This reduced strength was due to the fact that smaller yarns were used and there were fewer yarns present in the fabric.

It is not essential that a tape be made first and then built up and joined. Flat material of the invention could be joined into an endless belt.

The preceding specific embodiments are illustrative of the practice of the invention. It is to be understood, however, that other expedients known to those skilled in the art or disclosed herein may be employed without departing from the spirit of the invention or the scope of the appended claims.

I claim:

1. A nonwoven fabric comprised of (1) spaced apart linear yarns running in substantially the same direction and (2) interconnecting, polymeric matrix material at least partially encapsulating each of said linear yarns, the polymeric matrix material containing perforations through the fabric.

2. A nonwoven fabric having knuckle-free surfaces and being comprised of (1) generally parallel machine direction linear yarns and (2) interconnecting, cross-machine direction polymeric matrix material substantially encapsulating said machine direction yarns, the cross-machine direction matrix material containing spaced perforations through the fabric.

3. The fabric of claim 2, wherein the extremities of said encapsulating matrix material form a flat surface on one or both sides of said fabric.

4. The fabric of claim 2, wherein the matrix material comprises nondeformable polymeric material such as nylon, polyester, or the like.

5. The fabric of claim 2, wherein the cross-machine direction elements extend beyond one of the planar surfaces of said fabric.

6. The fabric of claim 1 or 2, wherein one or both surfaces of said fabric are covered with a porous layer of fibers, foam, or other such porous material.

7. The fabric of claim 1 or 2 which comprises an endless belt for paper machines.

8. The fabric of claim 1 or 2, wherein the yarn comprises sheath-core monofilaments having a core comprised of a polymeric material having a high modulus and having a sheath comprised of polymeric material having a melting temperature lower than that of the core material.

9. The fabric of claim 1 or 2, wherein the polymeric matrix material may be porous.

10. The fabric of claim 1 or 2, wherein the polymeric matrix material may be comprised of a polyurethane, a fluorinated polymer, or a copolymer of either.

11. The fabric of claim 1 or 2, wherein the polymeric matrix material is of melting temperature lower than that of the yarn.

12. The fabric of claim 1 or 2, wherein the extremities of said fabric are comprised entirely of polymeric matrix material, the yarn being completely encapsulated by matrix material.

13. The fabric of claim 1 or 2, wherein the perforations comprise side-to-side non-interconnected vertical flow passageways.

14. The fabric of claim 1 or 2, wherein the perforations are regularly spaced.

15. The fabric of claim 1 or 2, wherein the yarn has a high modulus.

* * * * *